United States Patent Office 2,939,322
Patented June 7, 1960

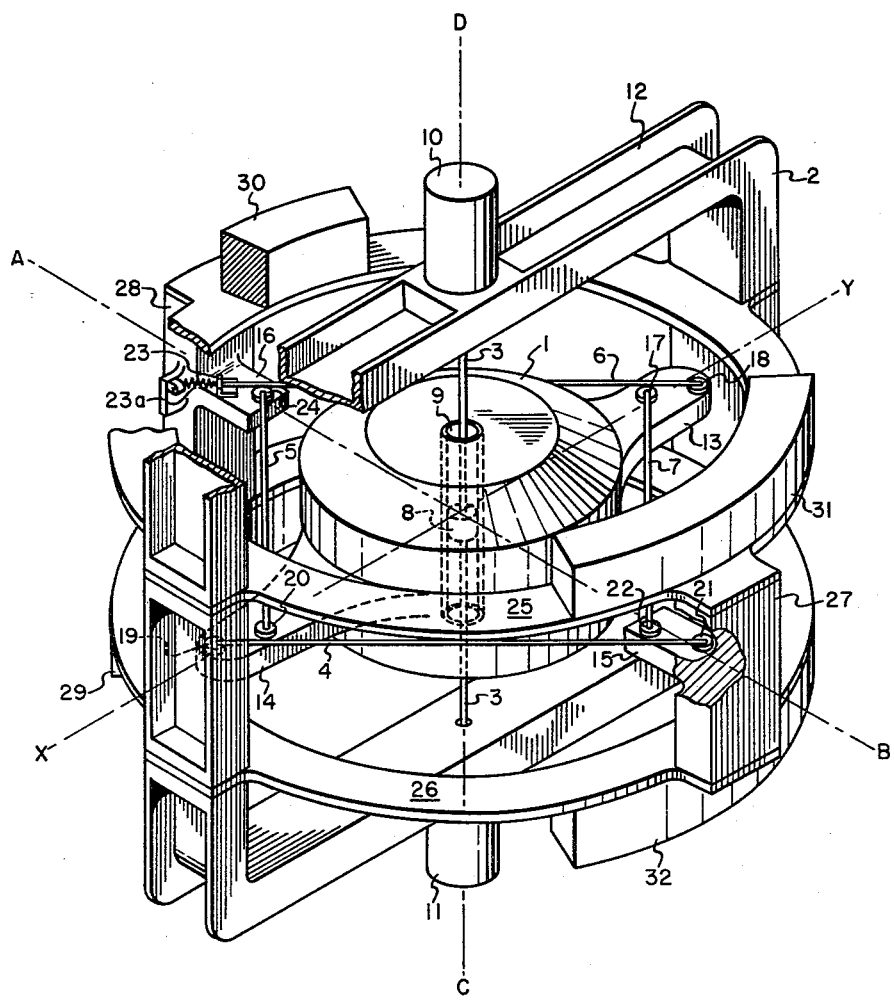

2,939,322
SUSPENSION SYSTEMS FOR SENSITIVE ELEMENTS

Hugh Brougham Sedgfield, Oakfield, Hampton, and Ronald Whalley, Whitton, England, assignors to The Sperry Gyroscope Company Limited, Brentford, England, a British company Filed Mar. 23, 1955, Ser. No. 497,218

Claims priority, application Great Britain Mar. 26, 1954

12 Claims. (Cl. 74—5)

This invention relates to suspension systems for sensitive elements of the general class in which a gyroscopic assembly is located in a support with limited freedom of angular motion about two perpendicular axes by means including a filament or ligament.

In such systems, the extent of angular movement of the assembly provided about the axes of freedom relative to the support in which it is suspended is strictly limited. The invention is considered particularly applicable to gyroscopic apparatus in which the element is a rotor casing and the support is a follow-up member that is servo-controlled to follow the element about two perpendicular axes so that the relative angular movements of the element and its support about any axis in the plane of the two axes of freedom of the element relative to the support are kept very small.

Where ligaments or filaments are employed in suspension systems, the action of accelerating and gravitational influences on the assembly causes variable elastic extension of the ligments or filaments. This extension tends to disturb the normal alignment of the suspension elements acting on the assembly, whence these elements may exert undesirable torques on the assembly.

It is a principal object of the present invention to minimize faulty operation in suspension systems attributable to the variable elastic extension of ligaments or filaments forming part of the suspension.

According to one aspect of the invention, a suspension system comprises a support having an anchorage thereon, a gyroscopic assembly having a central anchorage, a filament connecting the anchorage of the support to the central anchorage for sustaining the components of gravitational and acceleration influences impressed on the assembly longitudinally of the filament, axis providing means connecting the support to the assembly for preventing translatory movement of the assembly perpendicularly of the filament and rotational movement thereabout while determining two axes normally perpendicular to the filament about which the assembly can move through a limited angle, and means for maintaining the said axis and the central anchorage point in constant spatial relation whereby the extension of the filament under the said components of gravitational and acceleration influences is compensated.

Preferably the said axes always pass through the central anchorage. The central anchorage may be coincident with the centre of gravity of the assembly, and the filament may extend in opposite directions from the central anchorage of the assembly to a pair of anchorages on the support.

In a preferred embodiment, the support comprises a rigid part having the filament secured thereto in normal alignment with the rotor axis of the assembly, two resilient rings connected to the rigid support part and arranged in parallel planes normally perpendicular to the rotor axis, a pair of mountings fixedly connected to the rings midway of the connections of the rings to the support, each mounting being secured to both rings, the weight of the mountings and resiliency of the rings being such as to maintain a substantially constant spatial relation between the axes of the assembly and the central anchorage of the filament to thereby compensate the system for the influence thereon of components of acceleration and gravity along the axis of the rotor.

According to a further aspect of the invention, a suspension system for mounting a gyroscopic assembly in a support includes a set of four ligaments lying in a plane and disposed along the sides of a quadrilateral in that plane, these ligaments serving to connect anchorage points on the assembly lying on or near one diagonal of the quadrilateral to anchorage points on the support lying on or near the other diagonal of the quadrilateral. Preferably the diagonally positioned ligament anchorage points on the assembly are on lugs or posts extending outwards from opposite sides of the casing of the assembly. An additional constraint may be provided in the form of a filament secured to a central anchorage of the assembly and extending in both directions along an axis normal to the plane of the quadrilateral to a pair of suitably located anchorages on the support. If the filament exerts an undesired elastic centralizing force on the assembly, means may be employed to neutralize this force. In an embodiment arranged to provide such neutralization, each of the ligaments extending to two diagonally opposite corners of the quadrilateral is there secured to a separate anchorage point and the four said anchorage points are so arranged that an axis of rotation of the assembly in the plane of the quadrilateral is crossed by all four ligaments before the latter respectively reach the said anchorage points, whereby the four ligaments exert a torque on the assembly in a direction to increase its angular displacement about the said axis. By arranging the anchorage points at both ends of each ligament in this manner, the elastic centralizing force exerted by the filament may be neutralized for all axes in the plane of the quadrilateral.

In order that the invention may be clearly understood and readily carried into effect, an embodiment thereof, and a modification, will now be described by way of example with reference to the accompanying drawing, which shows a gyroscopic assembly having a suspension system according to the invention.

Referring now to the drawing, a gyroscopic assembly, constituted by a gyroscope rotor within its casing 1, is suspended in a cage-like support 2 by means of a filament 3 and four ligaments 4, 5, 6 and 7. The gyroscope may be used as a line-of-sight gyroscope or as a vertical gyroscope and may have associated with it torque motors for exerting precessing torques on the gyroscope casing, and servo motors to move the support 2 to maintain it substantially in alignment with the assembly in response to signals from pick-offs. Tilt detectors for a vertical gyroscope may be carried either by the casing 1 or the support 2. Torque and servo motors and other auxiliary devices are omitted from the drawing to facilitate the understanding of the invention, but the selection and arrangement of such devices to suit particular requirements is within the capacity of persons skilled in the art.

The gyroscope rotor of the assembly is arranged to rotate about a fixed hollow tube formed as a part of the casing 1. This construction enables the filament 3, constituted by a thin wire of circular section, to be secured to a central anchorage 8 within the hollow tube. The filament leaves the casing through two holes therein, one of which is shown at 9, and the filament ends are secured to the oppositely disposed anchorages 10 and 11 carried on a rigid channel section frame 12 forming part of the support 2. The filament 3 substantially locates the assembly relative to the support in the direction of its length, but leaves it free to rotate through very small angles about axes through the central anchorage 8.

The four ligaments 4, 5, 6 and 7, as may be seen, are arranged to lie along the sides of a quadrilateral, and are preferably constructed of thin metallic ribbon, though they may be of wire like the filament 3. In the present specification 3 is described as a filament, while 4, 5, 6, and 7 are described as ligaments in order to make the description clearer.

The gyroscope casing 1 provides a pair of diametrically opposite lugs 13 and 14, while the support 2 provides a pair of oppositely disposed lugs 15 and 16. Each lug is at one corner of the quadrilateral and provides correspondingly located anchorages for two of the ligaments. Thus lug 13 provides anchorages 17 and 18 for one end of ligaments 7 and 6; lug 14 provides anchorages 19 and 20 for one end of ligaments 4 and 5; lug 15 provides anchorages 21 and 22 for one end of ligaments 4 and 7 while lug 16 provides anchorages 23 and 24 for one end of ligaments 6 and 5.

It will be apparent that the ligaments operate effectively to prevent translatory motion of the assembly relative to the support in directions perpendicular to the filament 3, and prevent movement about the filament as an axis, while providing two principal axes of freedom, A—B and X—Y. It will be noted that the anchorages 17 to 20 and 21 to 24 do not lie precisely on the axes X—Y and A—B respectively, but are very slightly staggered in relation thereto. The reason for this arrangement will be described later.

The axis A—B is necessarily perpendicular to the filament 3, since it is fixed in direction in relation to the support. The axis X—Y is fixed in relation to the gyroscope casing, but not fixed in direction relative to the support 2 or filament 3. Both axes normally pass through the central anchorage 8.

The central anchorage 8 of the system is not necessarily precisely at the centre of gravity of the gyroscope-casing assembly, as it may sometimes be desirable in a vertical gyroscope to mount the casing with a slight pendulous moment. Pendulous moment is not wanted in a line-of sight gyroscope, however, and may not be desired in a vertical gyroscope.

Let it be supposed that the central anchorage does coincide with the centre of gravity of the rotor-casing assembly and that the assembly and support are subjected to a substantial acceleration having a component directed along the filament 3 and a further component directed at an angle both to the filament 3 and to the axis A—B. As a result of the component of accelerating force impressed on the assembly in the direction of filament 3, elastic extension of the latter will occur. Were the lugs 15 and 16 to remain fixed relative to the rigid frame 12, the centre of gravity of the assembly would move with respect to the axis A—B. That is to say, the axis A—B would no longer pass through the centre of gravity of the assembly. Thus any resultant of acceleration and gravity directed at an angle to both the filament 3 and the axis A—B will result in the impression of a disturbing torque on the assembly. In the case of a vertical gyroscope mounted with a small degree of pendulousness, the degree of pendulousness is changed and again gives rise to error.

However, the support 2 is so arranged that the lugs 15 and 16 do not remain fixed but move under the influences of gravity and acceleration directed along the filament to the same extent as the central anchorage moves when the filament 3 extends under the same conditions. In this way the source of error just referred to is eliminated. The support 2 includes two rings 25 and 26 of resilient material secured to the support 2 at oppositely disposed parts thereof in parallel relation. The mounting of the arrangement as indicated by elements 27 and 28 includes the respective lug parts 15 and 16. A resilient member constituted by rings 25 and 26 connects the mounting 27, 28 to the support element 2. The spaced anchorage lugs 15 and 16 of the mounting are arranged so that the anchorages provide the corners of a quadrilateral figure with the anchorages on the casing 1. The mounting shown includes the spaced anchorages 21, 22 and 23, 24. The ends of two of the ligaments are connected to one of the anchorages of the mounting and opposite anchorages on the casing. The ends of the other two of the ligaments are connected to the other of the mounting anchorages and opposite anchorages on the casing. Massive members, represented in the drawing by weights 29, 30, 31, and 32 are mounted on the rings in the neighbourhood of the lug mounts 27 and 28.

The weights 29 to 32 are so proportioned in relation to the elastic resistance to deformation of the rings on which they are mounted that under gravitational and acceleration influences the deflection of the mounting constituted by lugs 15 and 16 longitudinally of the filament 3 is the same as the deflection of the central anchorage 8 of the assembly due to extension of the filament 3 in the same conditions. This arrangement not only provides equal deflection under smoothly acting acceleration and gravitational influences, but results in equivalent response to shock and vibration, since the gyroscope casing and lugs have the same oscillation frequency in the longitudinal direction. The employment of two rings 25 and 26 provides a "parallel motion" effect so that the lugs 15 and 16 are virtually rigid in transverse directions with respect to the filament. The massive members 29 to 32 need not be mere weights, but could be auxiliary devices such as torque motor and/or pick-off elements selected and arranged to suit the particular purpose intended.

The filament 3 will tend to exert a slight elastic centralizing torque on the gyroscope when the casing 1 is angularly displaced about its axes X—Y and A—B. In certain applications, an uncompensated centralizing torque may be tolerated or desired, while in other applications it may be desired that the suspension system exert no torques about the axes of freedom provided by the system. The embodiment in the drawing has the anchorages for the ligaments so arranged that the tension in the ligaments compensates the elastic centralizing effect of the filament. It will be seen from the drawing that the ligament anchorages adjacent principal axes of rotation A—B and X—Y are so arranged that the ligaments cross these axes on the way to their anchorages. The anchorages are somewhat raised above the surfaces of the lugs carrying them, so that the lugs do not interfere with the ligaments.

Since rotation about each principal axis, or rotation having components about the principal axes will obviously tend to slacken one pair of ligaments while tightening the other pair. The tension resulting from the tightened ligaments exerts a torque tending to increase the angular displacement of the casing 1 about either of its axes A—B or X—Y. By the location of the anchorages on the casing and mounting, as shown, torque produced by the ligaments substantially balances the tendency of the filament 3 to centralize the casing 1 of the assembly.

As shown, tensioning means are provided for the pair of ligaments 6 and 7 by employing an anchorage 23 in the form of a guide block having a passage therethrough. The end of the ligament extending through the passage in the guide block anchorage 23 is fastened to one end of a tension spring 23a whose opposite end is anchored to the mounting element 28. The tension caused by the spring 23a on the ligament 6 is transmitted to the ligament 7 of the assembly. As shown, all of the anchorages except anchorage 23 are provided by collet type holders located on the casing lugs 13, 14 and mounting lugs 15, 16 in which the ends of the respective ligaments are fixedly connected. Any other known arrangement for tensioning the ligaments may be employed. Thus, the tension spring 23a could be replaced by a suitably arranged leaf spring, or the block anchorage 23 could be replaced by a collet type anchorage and a tension spring could be inserted in one of the ligaments. In some circumstances the elastic extension of the ligaments under tension may be sufficient to allow auxiliary tensioning means to be dispensed with. Where it is not necessary to compensate any centralizing torque, the ligament anchorages may be arranged precisely on the axes A—B and X—Y. Again, the ligaments may be arranged to provide positive centralizing torque by slightly offsetting the anchorage with respect to the axes in the direction opposite to that shown in the drawing.

What is claimed is:

1. A gyroscopic suspension system comprising a support having an anchorage thereon, a gyroscopic assembly with rotor and casing elements having anchorages on opposite sides of the casing and a central anchorage, a filament normally extending along the axis of the rotor through an opening in the casing connected at its ends to the anchorage on the support and to the central anchorage of the assembly, a mounting having two spaced anchorages arranged to provide the corners of a quadrilateral figure with the anchorages on said casing, a resilient member connecting said mounting to said support, and means providing limited freedom for the assembly with relation to the support about two axes normally perpendicular to the axis of the rotor including four ligaments providing the sides of the quadrilateral figure, the respective ends of two of which are connected to one of the anchorages of the mounting and opposite anchorages on the casing and the respective ends of the other two of which are connected to the other of the mounting anchorages and opposite anchorages on the casing, the weight of the mounting and resiliency of the member being such as to maintain a substantially constant spatial relation between the axes of the casing and central anchorage of the assembly to thereby compensate the system for the influence thereon of components of acceleration and gravity along the axis of the rotor.

2. A system of the character claimed in claim 1, in which the central anchorage of the assembly is substantially located at the point of intersection of the axes of the casing provided by the freedom providing means.

3. A system of the character claimed in claim 1, in which the central anchorage is substantially located at the center of gravity of the assembly.

4. A system of the character claimed in claim 1, in which the support includes two oppositely disposed anchorages, and the axially extending filament is connected at its ends to the anchorages on the support and to the central anchorage on the assembly.

5. A system of the character claimed in claim 1, in which the resilient member is provided by a pair of rings arranged in normally parallel relation and fixedly connected at oppositely disposed parts thereof to the support, and the mounting is provided by oppositely disposed parts fixedly connected to the rings midway of the connections thereof to the support.

6. A system of the character claimed in claim 1 including means for providing tension in cooperating pairs of the ligaments of the freedom providing means operatively connected to one of the ligaments of the pair.

7. A system of the character claimed in claim 1 in which one of the anchorages on the mounting is a block permitting longitudinal slippage of one of the ligaments, including a spring connecting the end of the ligament extending through the block and the mounting.

8. A gyroscopic suspension system comprising a support having two oppositely disposed anchorages thereon, a gyroscopic assembly with rotor and casing elements having anchorages on opposite sides of the casing and a central anchorage, a filament normally extending along the axis of the rotor through an opening in the casing connected at its ends to the anchorages on the support and to the central anchorage of the assembly, a mounting having two spaced anchorages arranged to provide the corners of a quadrilateral figure with the anchorages on said casing, a resilient member connecting said mounting to said support, and means providing limited freedom for the assembly with relation to the support about two axes normally perpendicular to the axis of the rotor including four ligaments providing the sides of the quadrilateral figure, the respective ends of two of which are connected to one of the anchorages of the mounting and opposite anchorages on the casing and the respective ends of the other two of which are connected to the other of the mounting anchorages and opposite anchorages on the casing.

9. A system of the character claimed in claim 8, in which the ligament anchorages on the casing and mounting are arranged so that the ligaments cross the axes of the freedom providing means and are effective with precession of the casing about one of its axes to exert a torque that counterbalances the centralizing force on the assembly due to the filament of the system.

10. In a gyroscopic suspension system, the combination of, a support, a gyroscopic assembly with rotor and casing elements having anchorages on opposite sides of the casing, a mounting having two spaced anchorages arranged to provide the corners of a quadrilateral figure with the anchorages on said casing, a resilient member connecting said mounting to said support, and means providing limited freedom for the assembly with relation to the support about two axes normally perpendicular to the axis of the rotor including four ligaments providing the sides of the quadrilateral figure, the respective ends of two of which are connected to one of the anchorages of the mounting and opposite anchorages on the casing and the respective ends of the other two of which are connected to the other of the mounting anchorages and opposite anchorages on the casing.

11. A system of the character claimed in claim 10 in which the quadrilateral arrangement of the ligaments is such that the same cross the axes of freedom of the casing.

12. A system of the character claimed in claim 10, in which said resilient member is provided by a pair of spaced parallel rings encircling the assembly and fixedly connected to the support in normally concentric relation to the axis of the rotor.

References Cited in the file of this patent

UNITED STATES PATENTS

| | | |
|---|---|---|
| 1,802,108 | Chessin | Apr. 21, 1931 |
| 2,377,212 | Cottrell | May 29, 1945 |
| 2,384,838 | Kellogg | Sept. 18, 1945 |
| 2,415,983 | Yerzley | Feb. 18, 1947 |
| 2,430,709 | Devorso | Nov. 11, 1947 |
| 2,746,301 | Henderson | May 22, 1956 |